US009380476B2

(12) United States Patent
Vaderna et al.

(10) Patent No.: US 9,380,476 B2
(45) Date of Patent: Jun. 28, 2016

(54) SERVICE CENTRIC MEASUREMENTS FOR MINIMIZING DRIVE TESTS

(75) Inventors: Peter Vaderna, Budapest (HU); László Kovács, Martonvásár (HU); Gábor Magyar, Dunaharaszti (HU); András Rácz, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 285 days.

(21) Appl. No.: 13/984,667

(22) PCT Filed: Feb. 15, 2011

(86) PCT No.: PCT/EP2011/000714
§ 371 (c)(1),
(2), (4) Date: Nov. 27, 2013

(87) PCT Pub. No.: WO2012/110054
PCT Pub. Date: Aug. 23, 2012

(65) Prior Publication Data
US 2014/0087716 A1 Mar. 27, 2014

(51) Int. Cl.
*H04W 24/08* (2009.01)
*H04L 12/26* (2006.01)
(Continued)

(52) U.S. Cl.
CPC ............ *H04W 24/08* (2013.01); *H04L 43/50* (2013.01); *H04W 24/06* (2013.01); *H04B 17/364* (2015.01); *H04W 24/10* (2013.01); *H04W 28/18* (2013.01)

(58) Field of Classification Search
CPC ... H04W 24/10; H04W 76/027; H04W 16/18; H04W 28/18; H04W 36/0055; H04W 36/0083; H04W 76/046; H04W 36/0066; H04W 36/0088; H04W 36/0094; H04W 48/04; H04W 4/023; H04W 4/025; H04W 84/045; H04W 24/06; H04W 24/08; G01S 5/0018; H04B 17/0072; H04L 43/50
See application file for complete search history.

(56) References Cited

U.S. PATENT DOCUMENTS

2009/0227251 A1   9/2009  Lei et al.
2009/0325572 A1  12/2009  Ji
(Continued)

FOREIGN PATENT DOCUMENTS

WO   2005022852 A1   3/2005
WO   2006005947 A1   1/2006

OTHER PUBLICATIONS

Unknown, Author. "3rd Generation Partnership Project; Technical Specification Group Services and System Aspects; Telecommunication management; Performance Management (PM); Concept and requirements (Release 11)." 3GPP TS 32.401 V11.0.0. Sep. 2009.

(Continued)

*Primary Examiner* — Nizar Sivji
(74) *Attorney, Agent, or Firm* — Murphy, Bilak & Homiller, PLLC

(57) ABSTRACT

The present disclosure relates to a technique for configuring and collecting network performance measurements in a mobile communications network, the mobile communications network comprising at least one network node and at least one mobile terminal 208 connected to the at least one network node, implementing a Minimization of Drive Tests (MDT) trace measurement configuration and collection. A method embodiment comprises the steps of performing, in the at least one mobile terminal 208, a service specific measurement based on a service specific measurement configuration, wherein the service specific measurement includes determining one or more quality metrics related to at least one of one or more services, one or more service types, one or more bearers, one or more applications and one or more application types provided in the mobile communications network, to obtain a result of the performed service specific measurement and generating, in the at least one mobile terminal 208, active test traffic based on an active measurement configuration to perform an active measurement, wherein the active measurement uses the generated test traffic to obtain a result of the performed active measurement, the result of the performed active measurement indicating the performance of the test traffic in the mobile communications network.

21 Claims, 10 Drawing Sheets

(51) Int. Cl.
*H04W 24/06* (2009.01)
*H04W 24/10* (2009.01)
*H04W 28/18* (2009.01)
*H04B 17/364* (2015.01)

(56) References Cited

U.S. PATENT DOCUMENTS

| | | | | |
|---|---|---|---|---|
| 2012/0309404 A1* | 12/2012 | Suzuki | H04W 24/10 | 455/450 |
| 2012/0322386 A1* | 12/2012 | Yi | H04W 24/08 | 455/67.11 |
| 2014/0357297 A1* | 12/2014 | Futaki | H04W 24/08 | 455/456.1 |

OTHER PUBLICATIONS

Unknown, Author. "3rd Generation Partnership Project; Technical Specification Group Services and System Aspects;Telecommunication management; Performance Management (PM); Performance measurements; Universal Terrestrial Radio Access Network (UTRAN) (Release 11)." 3GPP TS 32.405 V11.1.1. Dec. 2012.

Unknown, Author. "3rd Generation Partnership Project; Technical Specification Group Services and System Aspects; Telecommunication management; Subscriber and equipment trace; Trace concepts and requirements (Release 11)." 3GPP TS 32.421 V11.6.0. Mar. 2013.

Unknown, Author. "3rd Generation Partnership Project; Technical Specification Group Services and System Aspects; Telecommunication management; Subscriber and equipment trace; Trace control and configuration management (Release 11)." 3GPP TS 32.422 V11.8.1. Jul. 2013.

Unknown, Author. "3rd Generation Partnership Project; Technical Specification Group Services and System Aspects; Telecommunication management; Subscriber and equipment trace; Trace data definition and management (Release 11)." 3GPP TS 32.423 V11.5.0. Jun. 2013.

Unknown, Author. "3rd Generation Partnership Project; Technical Specification Group Services and System Aspects;Telecommunication management; Performance Management (PM); Performance measurements Evolved Universal Terrestrial Radio Access Network (E-UTRAN) (Release 12)." 3GPP TS 32.425 V12.0.0. Jun. 2013.

Unknown, Author. 3rd Generation Partnership Project; Technical Specification Group Services and System Aspects; Telecommunication management; Key Performance Indicators (KPI) for Evolved Universal Terrestrial Radio Access Network (E-UTRAN): Definitions (Release 11). 3GPP TS 32.450 V11.0.0. Sep. 2012.

Unknown, Author. 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11). 3GPP TS 37.320 V11.3.0. Mar. 2013.

3rd Generation Partnership Project. 3GPP TR 32.827 V10.1.0 (Jun. 2010). 3rd Generation Partnership Project; Technical Specification Group Services and System Aspects; Telecommunication management; Integration of device management information with Itf-N (Release 10). Jun. 2010, pp. 1-24.

3rd Generation Partnership Project. 3GPP TS 37.320 V10.0.0 (Dec. 2010). 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10). Dec. 2010, pp. 1-18.

3rd Generation Partnership Project. "Text Proposal for measurement logs for MDT." 3GPP TSG-RAN WG2 meeting #66bis, R2-094069, Jun. 29-Jul. 3, 2009, pp. 1-7, Los Angeles, CA, USA.

* cited by examiner

SERVICE CENTRIC MEASUREMENTS FOR MINIMIZING DRIVE TESTS

TECHNICAL FIELD

The invention generally relates to the field of network performance management in a mobile communications network. More specifically, the invention relates to a technique for configuring and collecting network performance measurements in a mobile communications network implementing a Minimization of Drive Tests (MDT) trace measurement configuration and collection.

BACKGROUND

Mobile customers are increasingly demanding service availability, continuity, and consistency. They expect to have access to a wide variety of services all the time and they expect their services to be stable and reliable. Such services do not only include standard telephony services, but further include multimedia telephony, Internet, mobile Television (mobile TV) and other media services. Further, mobile customers expect to receive these services at an increasingly high service quality.

At the same time, wireless operators must optimize their network and run their operations efficiently and seamlessly to deliver and maintain these services over complex multi-vendor and multi-technology networks that consist of legacy and Next Generation (NGN) wireless technologies. Service providers must focus on proactively improving their customers' service quality and availability and optimizing network performance to meet increasing customer retention.

Therefore, the monitoring and evaluation of network performance, in particular the observation of service performance as seen by the customer are becoming increasingly important for network operators in the management and operation of communication networks. Typically measures like throughput, delay, loss, jitter and further service quality metrics derived from these basic performance descriptors are investigated and evaluated in service centric management for a specific communication service.

Examples for service quality metrics for different types of communication services are end-to-end throughput as performance metrics for the generic mobile broadband service, and mobile TV Quality of Experience (QoE) as standardized in 3GPP for the mobile TV service.

There are basically two main sources of information to collect performance data from. The performance data can either be collected from the network or from the mobile terminals, e.g. User Equipments (UEs) in terms of the Universal Mobile Telecommunications System (UMTS) in the network. The performance data collected from the network may include radio link performance for the UE, cell status information, transport network status information or the like. Regarding the second source of information, i.e. the UE, it is possible to collect information both about the radio network (such as radio link quality) but also about application perceived quality. However, collecting service quality reports from the UE in the network is difficult or impossible in most typical cases, as the application servers are typically outside of the domain of the cellular network operator and, hence, the application performance measurements can not be accessed.

Current cellular systems including 2G/3G systems and the newly emerging Long Term Evolution (LTE) system support the trace functionality to collect information from the network for a particular user session. Further, these systems support Performance Management (PM) counters and Key Performance Indicators (KPIs) providing aggregate cell or network level information. During tracing all network activities related to a particular user can be logged and later delivered to a central management entity for evaluation. Logged network activities include signaling messages sent/received either on the radio interface or network node interfaces.

Subscriber and equipment trace provide very detailed information at call level on one or more specific mobile terminals. Contrary to performance measurements, which are a permanent source of information, trace is activated on user demand for a limited period of time for specific analysis purposes. Trace plays a major role in activities such as determination of the root cause of a malfunctioning mobile, advanced troubleshooting, optimization of resource usage and quality, Radio Frequency (RF) coverage control and capacity improvement, dropped call analysis, Core Network and UMTS Terrestrial Radio Access Network (UTRAN) end-to-end UMTS procedure validation and so on.

The capability to log data on any interface at call level for a specific user (e.g. identified by the International Mobile Subscriber Identity (IMSI)) or mobile type (e.g. identified by the International Mobile Station Equipment Identity (IMEI) or International Mobile Station Equipment Identity Software Version (IMEISV)), or service initiated by a user allows getting information which cannot be deduced from performance measurements such as perception of end-user Quality of Service (QoS) during his call (e.g. requested QoS vs. provided QoS), correlation between protocol messages and RF measurements, or interoperability with specific mobile vendors. Moreover, performance measurements provide values aggregated on an observation period, whereas subscriber and mobile terminal trace give instantaneous values for a specific event (e.g. call, location update, etc.). In order to produce this data, subscriber and mobile terminal trace are carried out in the Network Elements (NEs) of the network. The data can then be transferred to an external system.

The cell traffic trace functionality, also available in 3GPP systems allows logging and collecting activities of all users located in particular cell(s). Thereby, the selection of users for tracing can be done based on cells rather than particular IMSI or IMEI as it was the case in subscriber and equipment trace. In this way the subscriber and equipment trace together with cell traffic trace complement each other and provide a large degree of freedom for the operator to collect measurements and logging data from the network.

More recently 3GPP has started to work on the concept of Minimization of Drive Test (MDT) measurements, which enables to instruct UEs to perform certain radio measurements and to collect them in the management system with the purpose to replace some of the drive tests of the operators with measurements done by customer devices. Fur this purpose, an equipment (test mobile) that collects measurements and location information collects all the required information and this information is used offline to analyze the coverage in different locations. Based thereon, the parameters, power, antenna locations, antenna tilts, etc. are optimized. After the changes to any of the optimization parameters, the drive test has to be undertaken again to make sure that the impact of these changes is positive. Using drive tests for network optimization purposes is costly and burdensome. Thus, it is desirable to develop automated solutions reduce the operator costs for network deployment and operation.

Further, so far, MDT measurements currently include only measurements performed on the radio link.

For collection of UE service and application layer performance statistics there are standards which define service quality reports from the terminal, also called Quality of Experience (QoE) reports. The service quality or QoE reports are typically defined individually for a given application/service as the parameters used to describe the QoS largely depend on the type and characteristics of a service. Such QoE reports are defined for instance, for Mobile TV, Internet Protocol Television (IPTV), multimedia telephony services and the definition of such reporting functions are often spread across several standardization bodies, such as 3GPP, TISPAN, BBF, Open IPTV Forum, ITU-T.

In addition to classifying performance measurements according to whether the terminal or the network performs the measurement, an orthogonal dimension to classify measurement methods is to differentiate between active and passive measurements. In case of passive measurements the measurements are done on the live user traffic without impacting the ongoing traffic in any way. In case of active measurements specific test traffic is generated and the measurements are performed on that generated test traffic. The drawback of active measurements is that they impact the ongoing regular traffic and thereby influence the measurement environment itself. The benefit, however, is that it gives control over the measurement traffic and thereby it enables to choose the characteristics of the traffic, as well as, the time instant and the network parts when and where the measurements are to be performed.

In today's networks there exists an entity called Network Management System (NMS) that is responsible for the management and operation of the network and for the observability of the quality of its offered services. The operation of NMS is based on continuous live network information that is typically coming from logs and measurements.

Regardless of whether the measurements going into the NMS are passive or active, and regardless of whether these measurements are performed by the terminal (e.g. by QoE reporting) or done by the network, the main principle behind the NMS is to collect significant amount of measurements (also called "samples") from the usage of a service and then to process them and provide a reliable view of the performance of the particular service. The individual service usage transactions, e.g., in a mobile data network, have many—in most cases independent—dimensions such as, location (cell), perceived radio quality, type and capability of UE, background load in the cell, time of the day and so on, which of course all have effect on the service performance.

One important task of the NMS is to pinpoint the main reasons if the service performance differs from the expectations in order to provide fault localization and root cause analysis functionality for the network operator. To achieve this, the sample measurements are statistically aggregated by specialized algorithms and analyzed along the specific dimensions, cross correlations are filtered, and reasoning is given. A key issue for such NMS functionality to work properly is to have enough sample measurements across all the above mentioned measurement dimensions like location, radio quality, UE capability, network load, time, etc. It can happen that there are certain time periods, cells, UEs or combinations of these, in which circumstances there are not enough measurements for a given service. However, a sufficient amount of samples across all dimensions is needed in order to provide meaningful network performance analysis.

Additional sample measurement generation through drive tests is, however, typically expensive and often requires a huge arsenal of equipment, mobility, and time to execute. Therefore, other means for ensuring the sufficient number of sample measurements entering into the NMS are necessary.

SUMMARY

Accordingly, there is a need for an improved and more efficient technique for configuring and collecting network performance measurements in a mobile communications network.

According to a first aspect, a method for collecting network performance measurements in a mobile communications network is provided, wherein the mobile communications network comprises at least one network node and at least one mobile terminal connected to the at least one network node, implementing a Minimization of Drive Tests (MDT) trace measurement configuration and collection. The method comprises at least one of the steps of: performing, in the at least one mobile terminal, a service specific measurement based on a service specific measurement configuration, wherein the service specific measurement includes determining one or more quality metrics related to at least one of one or more services, one or more service types, one or more bearers, one or more applications and one or more application types provided in the mobile communications network, to obtain a result of the performed service specific measurement; and generating, in the at least one mobile terminal, active test traffic based on an active measurement configuration to perform an active measurement, wherein the active measurement uses the generated test traffic to obtain a result of the performed active measurement, the result of the performed active measurement indicating the performance of the test traffic in the mobile communications network.

The result of the performed service specific measurement may indicate the performance of at least one of the one or more services, the one or more service types, the one or more bearers, the one or more applications and the one or more application types provided in the mobile communications network.

The at least one mobile terminal may be any device capable of communicating in the mobile communications network. For example, the at least one mobile terminal may be a Mobile Station (MS) in terms of the Global System for Mobile Communications (GSM), a User Equipment (UE) in terms of UMTS or an LTE UE in terms of LTE or LTE Advanced. The network node may be any kind of network node like a NodeB or RNC in terms of UMTS or an eNodeB in terms of LTE or LTE Advanced and is normally connected to the mobile terminal via an air interface. The mobile communications network may comprise a Radio Access Network (RAN), e.g. an UMTS Terrestrial RAN (UTRAN) in terms of UMTS or an evolved UTRAN (e-UTRAN) in terms of LTE or LTE Advanced, allowing connectivity between the at least one mobile terminal an a Core Network (CN).

The service provided in the mobile communications network may be any kind of telephony or multimedia service which can be provided by the mobile operator and received by the mobile terminal. For example, the service can be a standard or multimedia telephony service, a mobile television (mobile TV) service or any other type of multimedia service like streaming video, video-on-demand, social networking or interactive gaming or the simple best-effort data service with or without service quality guarantees. The application may be any multimedia application typically provided by an applications provider like interactive multimedia applications such as 3D virtual mapping, voice over LTE, and high definition (HD) multiplayer online gaming, video streaming application (e.g., Youtube) or voice application (e.g., Skype). The application may be any application that can be used on the mobile terminal and where the server side of the application is typically provided by a provider on the Internet, not by the network operator. Similar services (applications) may be categorized as having the same service (application) type. For example, services even abstractly related to TV may be categorized as a TV service type. In this context, the term service specific (centric) measurement may be understood as a measurement related to the service and application layer, and giving information about the performance and quality of the particular service or application rather than relating to e.g. the radio link layer. Service and application layer reports can be collected from the mobile terminal by means of the service specific (centric) measurement, also called Quality of Experience (QoE) measurements.

The active measurement may comprise at least one of a service specific measurement and a non-service specific measurement. For example, the active measurement may comprise a plurality of measurements performed on the generated traffic, wherein one or more (a first subset) of the performed measurements may be service specific (e.g., performed on the service or application layer) and one or more (a second subset) of the performed measurements may be non-service specific (e.g., performed on the radio link layer).

The method according to the first aspect may further comprise the step of transmitting, by the at least one mobile terminal, at least one of the result of the performed service specific measurement and the result of the performed active measurement to the at least one network node. It is conceivable that the mobile terminal performs all measurements indicated by the service specific measurement configuration and/or the active measurement configuration, thereafter generates a service specific measurement report and/or an active measurement report summarizing the results of the performed measurements and forward said report(s) to the network node. After receiving the results, the at least one network node may forward at least one of the received result of the performed service specific measurement (e.g. the service specific measurement report) and the received result of the performed active measurement (e.g. the active measurement report) to a network management system, which may be indirectly connected to the at least one network node.

In accordance with a first implementation of the first aspect, the method may further comprise the step of receiving, by the at least one mobile terminal, at least one of the service specific (centric) measurement configuration and the active measurement configuration from the at least one network node. After receiving the respective measurement configuration(s), the mobile terminal preferably performs the respective measurement(s) as instructed in the received measurement configuration(s). If, for example, the received service specific measurement configuration indicates that no service specific measurement configuration should be performed, but the received active measurement configuration indicates the necessity to perform an active measurement, the mobile terminal generate the test traffic as indicated by the active measurement configuration and performs the instructed active measurement on the test traffic. It is conceivable that only one mobile terminal receives the service specific measurement configuration and/or the active measurement configuration from the network node. It is, however, also conceivable that two or more or all (a plurality or) mobile terminals connected to the network node receive the same or similar measurement configurations.

In one variant of the first implementation, the active measurement configuration may include parameters for configuring the test traffic for performing the active measurement. The parameters may include at least one of the address of a test server to which the at least one mobile terminal has to connect for generating the test traffic, the type of the test traffic, the direction of the test traffic and the duration of the test. The parameters are only exemplary but not limited thereto. In accordance with this variant, the method may further comprise the step of generating, by the at least one mobile terminal, the test traffic based on the parameters. For example, after obtaining the parameters from the active measurement configuration, the mobile terminal may access the test server as indicated by the address and may generate the test traffic using the indicated type of test traffic and direction (e.g., uplink or downlink). The measurement may then be performed on the generated test traffic as long as indicated by the duration.

The determined quality metrics may comprise at least one of throughput, loss, delay, jitter and Quality of Experience ("QoE") of at least one of the one or more services, one or more service types, one or more bearers, one or more applications and one or more application types. The quality metrics are, however, not limited to these parameters, but may comprise different or further parameters useful for determining the service quality perceived by the user.

In accordance with a second implementation of the first aspect which may/may not be combined with the first implementation, the method my further comprise the steps of performing, by the at least one network node, active measurements using the generated test traffic, and transmitting, by the at least one network node, the results of the active measurements to the network management system. In this way, active measurement results from the at least one network node can be collected in addition to the service specific measurement results and/or the active measurement results collected from the at least one mobile terminal connected to the network node.

According to a second aspect, a method for configuring network performance measurements in a mobile communications network is provided, wherein the mobile communications network comprises at least one network node, at least one mobile terminal connected to the at least one network node and a network management system connected to the at least one network node, implementing a Minimization of Drive Tests (MDT) trace measurement and collection. The method comprises the steps of: transmitting, by the network management system, at least one of a service specific measurement configuration for performing, in the at least one mobile terminal, a service specific measurement and an active measurement configuration for generating, in the at least one mobile terminal, an active test traffic to perform an active measurement, wherein the service specific measurement includes determining one or more quality metrics related to at least one of one or more services, one or more service types, one or more bearers, one or more applications and one or more application types provided in the mobile communications network, to obtain a result of the performed service specific measurement, and the active measurement uses the generated test traffic to obtain a result of the performed active measurement, the result of the performed active measurement indicating the performance of the test traffic in the mobile communications network; and receiving, by the network management system, at least one of the result of the performed service specific measurement and the result of the performed active measurement.

The result of the performed service specific measurement may indicate the performance of at least one of the one or more services, the one or more service types, the one or more bearers, the one or more applications and the one or more application types provided in the mobile communications network.

The service specific measurement configuration and/or the active measurement configuration may be generated by the network management system based on a performance of one or more mobile terminal in the network. If, for example, it is known to or determined by the network management system that one or more mobile terminals located at a certain location in the network experience a decreased Quality of Service (QoS), the network management system may generate the measurement configurations to figure out the source of the decreased performance. In this context, the method may further comprise the step of selecting, by the network management system, the at least one mobile terminal to perform the respective measurements based on a detection of decreased network performance in an area in which the at least one mobile terminal is located.

In accordance with one realization of the second aspect, the method may further comprise the step of determining, by the network management system, the network performance based on at least one of the received result of the performed service specific measurement and the received result of the performed active measurement.

The method may further comprise the step of processing, by the network management system, at least one of the received result of the performed service specific measurement and the received result of the performed active measurement to identify the cause of decreased network performance. After identifying the cause of the decreased network performance, appropriate measures may be taken by the network operator or the network management system to eliminate the cause. Thereafter, the network management system may configure a further service specific measurement configuration and/or active measurement configuration having the same or a different configuration than the previous configurations to verify whether the cause has been eliminated or is still present.

According to a third aspect, a computer program product is provided, comprising program code portions for performing steps of anyone of the method aspects described herein, when the computer program product is run on one or more computing devices. The computer program product may be stored on a computer readable recording medium.

According to a fourth aspect, a mobile terminal for collecting network performance measurements in a mobile communications network is provided, wherein the mobile communications network comprises at least one network node and the mobile terminal connected to the at least one network node, implementing a Minimization of Drive Tests (MDT) trace measurement configuration and collection. The mobile terminal comprises a measurement component which is adapted to at least one of: perform a service specific measurement based on a service specific measurement configuration, wherein the service specific measurement includes determining one or more quality metrics related to at least one of one or more services, one or more service types, one or more bearers, one or more applications and one or more application types provided in the mobile communications network, to obtain a result of the performed service specific measurement; and generate an active test traffic based on an active measurement configuration to perform an active measurement, wherein the active measurement uses the generated test traffic to obtain a result of the performed active measurement, the result of the performed active measurement indicating the performance of the test traffic in the mobile communications network.

The result of the performed service specific measurement may indicate the performance of at least one of the one or more services, the one or more service types, the one or more bearers, the one or more applications and the one or more application types provided in the mobile communications network.

The mobile terminal may further comprise a transmitting component for transmitting at least one of the result of the performed service specific measurement and the result of the performed active measurement to the at least one network node.

The mobile terminal may also comprise a receiving component for receiving at least one of the service specific measurement configuration and the active measurement configuration from the at least one network node.

The receiving component may be adapted to receive at least one of the service specific measurement configuration and the active measurement configuration via the 3GPP Radio Resource Control (RRC) protocol. Alternatively, the receiving component may be adapted to receive at least one of the service specific measurement configuration and the active measurement configuration via a dedicated measurement configuration protocol, which may or may not use the services of the RRC protocol.

The active measurement configuration may include parameters for configuring the test traffic for performing the active measurement, and the mobile terminal further comprises a traffic generating component for generating the test traffic based on the parameters.

According to a fifth aspect, a network management system for configuring network performance measurements in a mobile communications network is provided, wherein the mobile communications network comprises at least one network node and at least one mobile terminal connected to the at least one network node, implementing a Minimization of Drive Tests (MDT) trace measurement configuration and collection. The network management system comprises: a transmitting component for transmitting at least one of a service specific measurement configuration for performing, in the at least one mobile terminal, a service specific measurement and an active measurement configuration for generating, in the at least one mobile terminal, an active test traffic to perform an active measurement, wherein the service specific measurement includes determining one or more quality metrics related to at least one of one or more services, one or more service types, one or more bearers, one or more applications and one or more application types provided in the mobile communications network, to obtain a result of the performed service specific measurement, and the active measurement uses the generated test traffic to obtain a result of the performed active measurement, the result of the performed active measurement indicating the performance of the test traffic in the mobile communications network; and a receiving component for receiving at least one of the result of the performed service specific measurement and the result of the performed active measurement.

The result of the performed service specific measurement may indicate the performance of at least one of the one or more services, the one or more service types, the one or more bearers, the one or more applications and the one or more application types provided in the mobile communications network.

The network management system may further comprise a performance determining component for determining the network performance based on at least one of the received result of the performed service specific measurement and the received result of the performed active measurement.

The transmitting component may be adapted to transmit at least one of the service specific measurement configuration and the active measurement configuration using the 3GPP trace management IRP services on the Itf-N interface.

BRIEF DESCRIPTION OF THE DRAWINGS

In the following, the invention will further be described with reference to exemplary embodiments illustrated in the figures, in which.

DETAILED DESCRIPTION

In the below, for purposes of explanation and not limitation, specific details are set forth in order to provide a thorough understanding of the present invention. It will be apparent to one skilled in the art that the present invention may be practiced in other embodiments that depart from these specific details. For example, although the exemplary embodiments are described in connection with User Equipments (UEs) and eNodeBs to illustrate the present invention, they are equally applicable to other kinds of mobile terminals and network nodes. Also, the invention may be practiced in any network to which mobile users may attach.

Those skilled in the art will further appreciate that the functions explained herein below may be implemented using hardware circuitry, software means, or a combination thereof. The software means may be in conjunction with a programmed microprocessor or a general purpose computer, using an Application Specific Integrated Circuit (ASIC) and/ or Digital Signal Processors (DSPs). It will also be apparent that when the present invention is described as a method, it may also be embodied in a computer processor and a memory coupled to the processor, wherein the memory is encoded with one or more programs that perform the method when executed by the processor.

Figure 1:
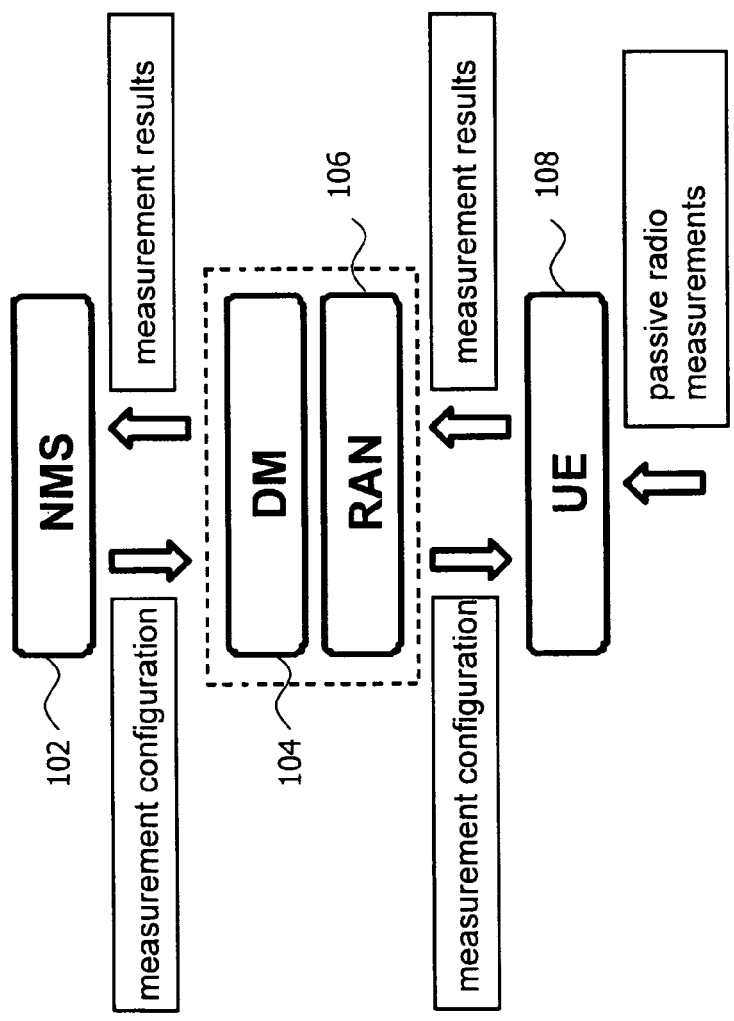
FIG. 1 is a schematic illustration of a flow diagram of a basic Minimization of Drive Tests (MDT) concept.

FIG. 1 shows a schematic illustration of a network implementing a basic Minimization of Drive Tests (MDT) concept 100. In this basic MDT concept, a Network Management System (NMS) 102, a Domain Manager (DM) 104 and a Radio Access Network (RAN) 106 is provided. The RAN 106 comprises at least one RAN node (not shown) which is connected to a User Equipment (UE) 108 via an air interface. FIG. 1 exemplarily only shows one UE 108, but in the following it will be exemplarily referred to a plurality of UEs 108 which are coupled to each of the one or more RAN nodes. The UE may be a UE in terms of UMTS or may be an LTE UE in terms of LTE or may be any other kind of mobile terminal. The RAN may be an UTRAN in terms of UMTS or an e-UTRAN in terms of LTE or may be any other kind of air interface comprising one or more network nodes for communication with the UEs.

In the basic MDT concept 100 shown in FIG. 1, the operator uses the NMS 102 in order to take care of network management and network optimization. As exemplarily shown in FIG. 1, the DM 104 is connected to the NMS 102 via an air interface. The DM 104 is responsible for the vendor specific management and configuration of the one or more RAN 106 network nodes. In the basic concept, the DM 104 provides an interface toward the NMS 102, which can be but is not restricted to a 3GPP standardized management interface (Itf-N interface). By means of this interface, the DM 104 and the NMS 102 can communicate with each other. Some specific RAN 106 nodes, such as a Radio Network Controller (RNC) in Wideband Code Division Multiple Access (WCDMA) or an eNodeB in LTE are responsible for communication with the UEs 108.

For network management and optimization purposes, the NMS 102 generates a measurement configuration and forwards the measurement configuration to the DM 104. The DM 104 forwards the measurement configuration to the appropriate RAN 106 node in the RAN 106 which itself forwards the measurement configuration to the UEs 108. In accordance with the received measurement configuration, the UEs 108 perform the respective passive radio measurements and send the results of these measurements back to the RAN 106 node.

In the exemplary MDT concept 100 shown in FIG. 1, the RAN 106 and the at least one UE 108 are connected to each other via an air interface. In the same exemplary MDT concept 100, the NMS 102 is connected to the DM 104 via a wireline interface. Likewise, the DM 104 is connected to the at least one RAN 106 node via a wireline interface.

The measurement configuration generated by the NMS 102 only contains information instructing the UEs to perform passive measurements. In accordance therewith, in the basic MDT concept 100, only passive radio measurements are performed by the UEs 108. For example, the UEs 108 perform coverage measurements, signal to noise ratio (SNR) measurements, interference measurements and the like. The results of these measurements are then forwarded to the RAN 106 node, the DM 104 and then finally to the NMS 102. The NMS 102 then considers the results for network performance management and optimization.

Figure 2:
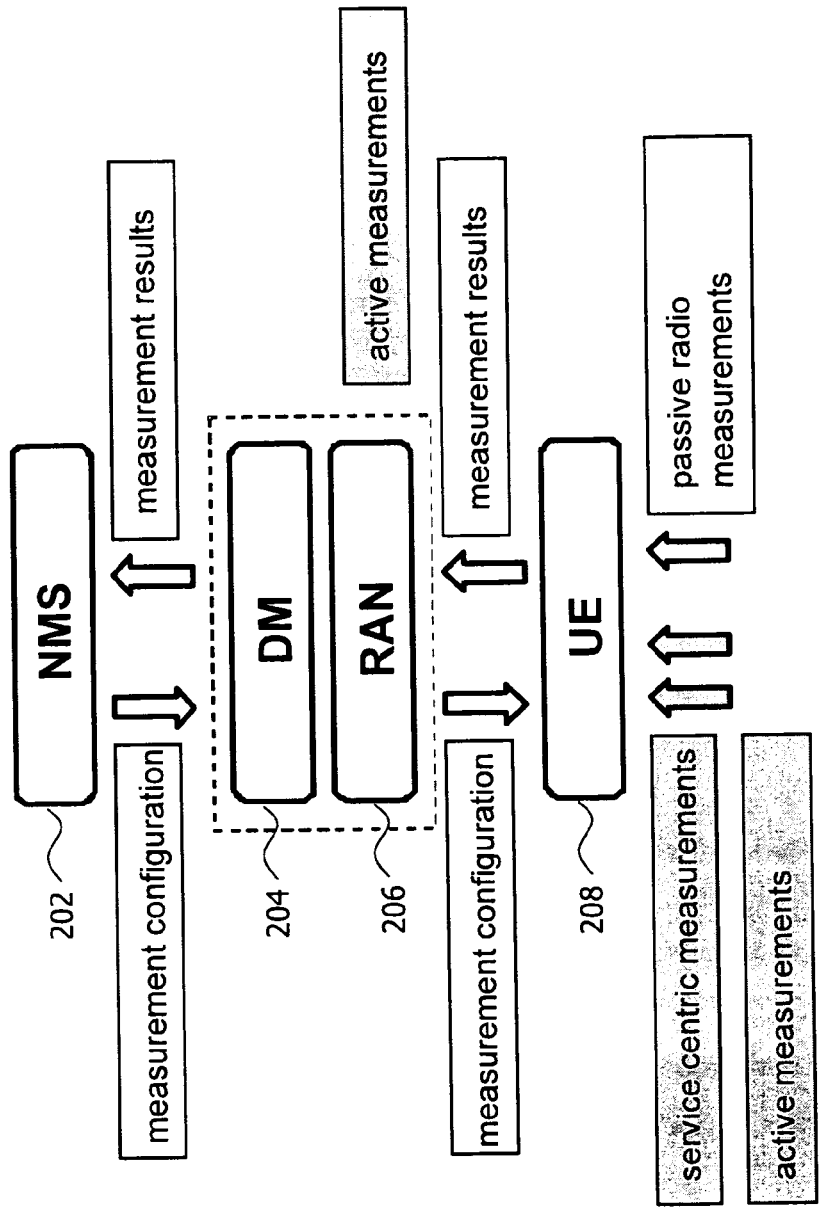
FIG. 2 is a schematic illustration of an improved MDT concept comprising a network management system according to a first device embodiment and a user equipment according to a second or third device embodiment.
Figure 3:
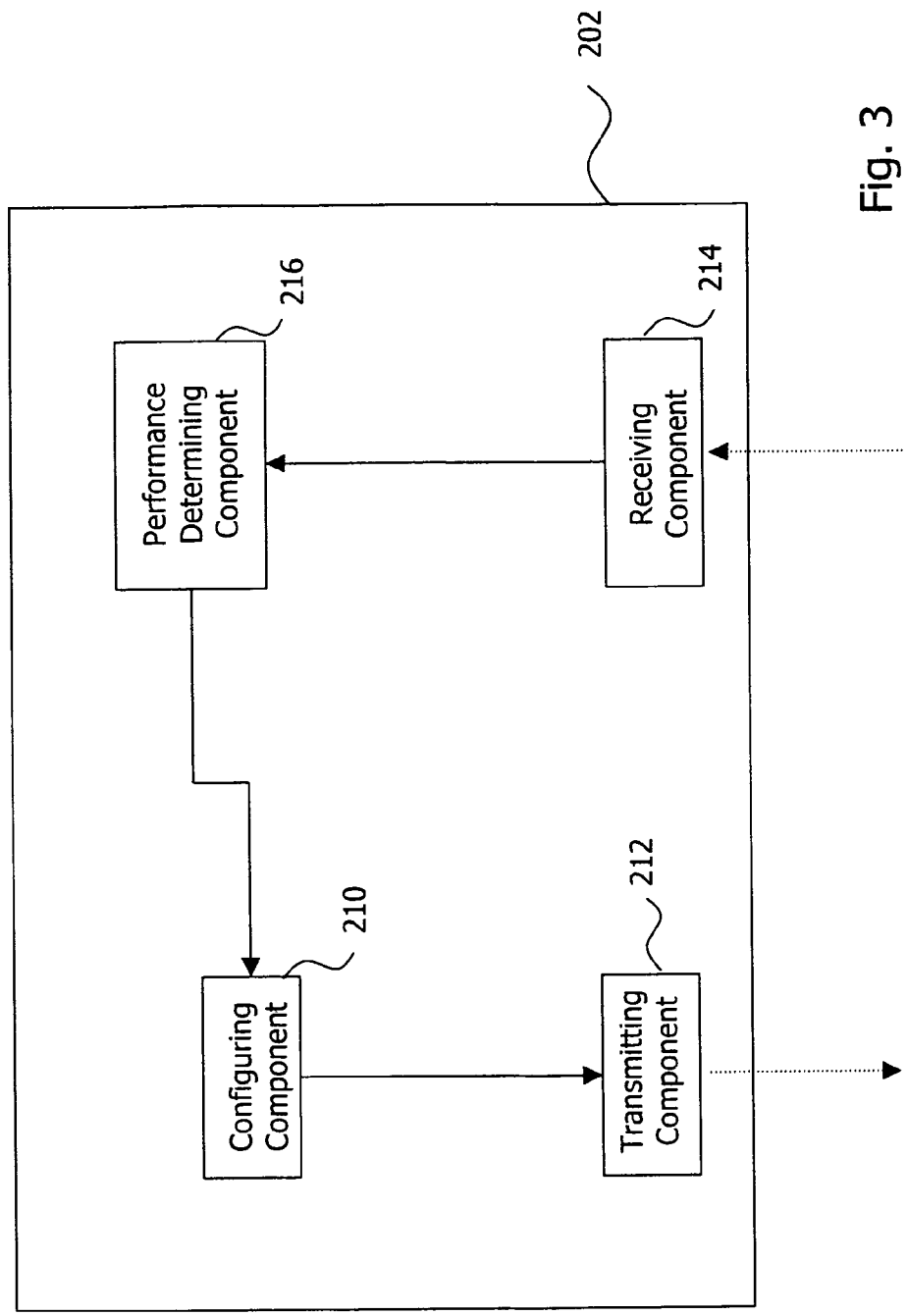
FIG. 3 is a schematic illustration of the network management system of FIG. 2 according to the first device embodiment.
Figure 4:
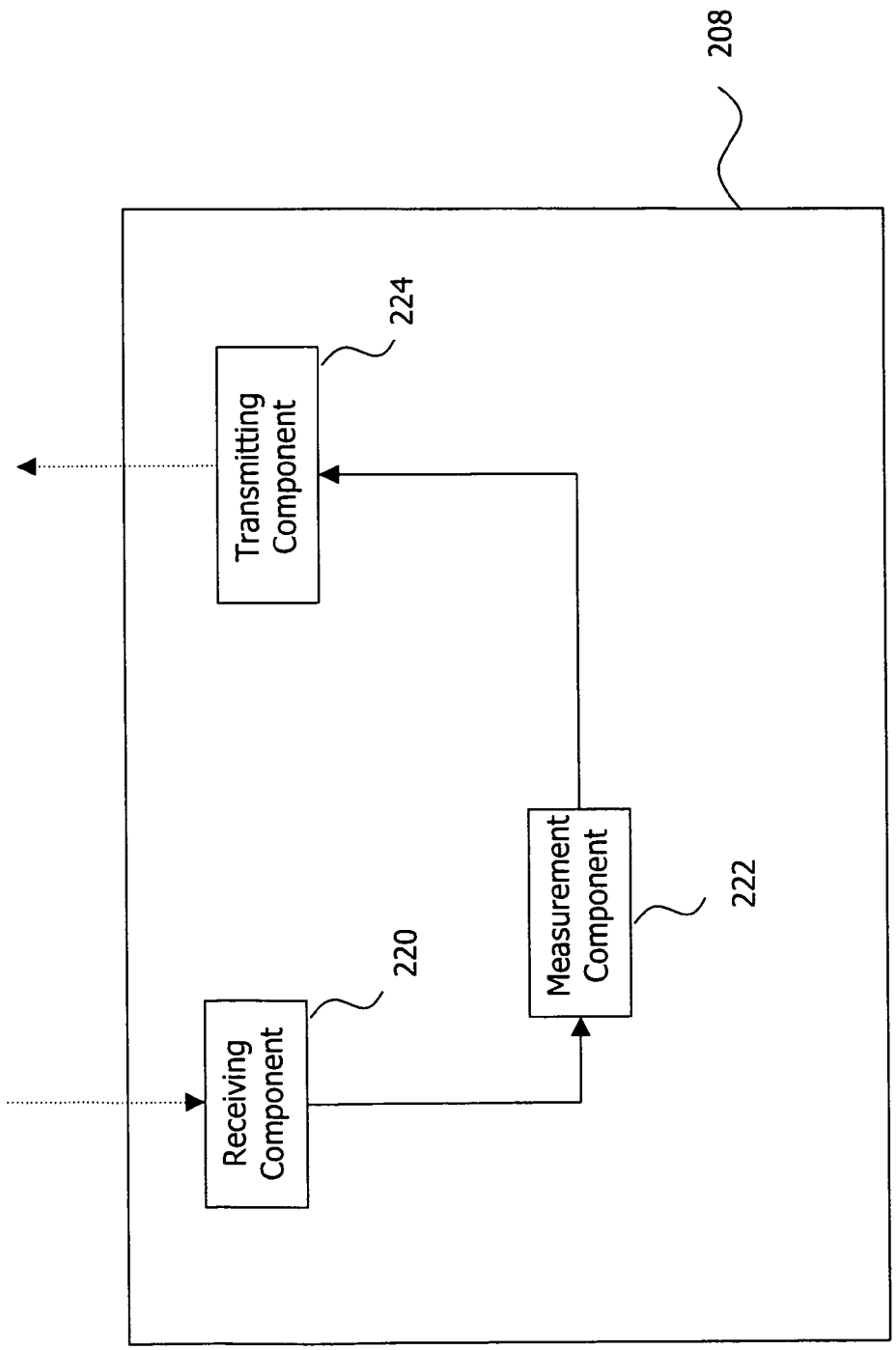
FIG. 4 is a schematic illustration of the user equipment of FIG. 2 according to the second device embodiment.
Figure 5:
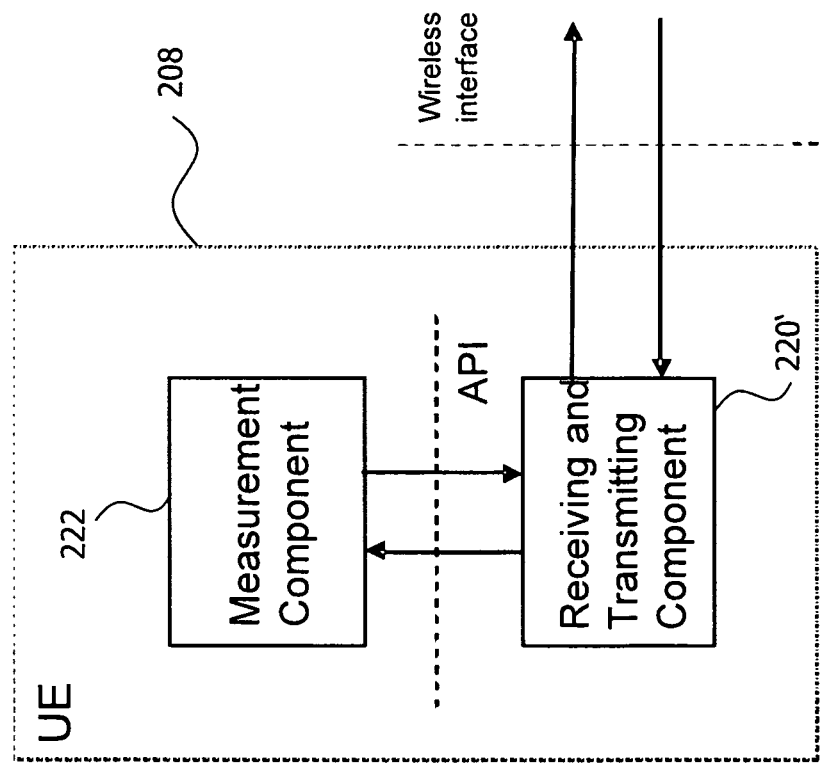
FIG. 5 is a schematic illustration of the user equipment of FIG. 2 according to the third device embodiment.

FIG. 2 shows a schematic illustration of an improved MDT concept 200 having an improved NMS 202 according to a first device embodiment (shown in FIG. 3) and UEs 208 (again illustrated as one UE 208 only) according to a second or third device embodiment (as shown in FIGS. 4 and 5). The DM 204 and RAN 206 of FIG. 2 have the same functionality as the DM 104 and RAN 106 of FIG. 1. The NMS 202 and the UEs 208 have the same basic functionality as the NMS 102 and the UEs 108 of FIG. 1, but further provide additional functionality as described below. Like the concept of FIG. 1, the improved concept of FIG. 2 comprises the NMS 202, the DM 204, one or more RANs 206 and one or more UEs 208 connected to at least one RAN 206 node.

In the exemplary improved MDT concept 200 shown in FIG. 2, the RAN 206 and the at least one UE 208 are connected to each other via an air interface. In the same exemplary improved MDT concept 200, the NMS 202 is connected to the DM 204 via a wireline interface. Likewise, the DM 204 is connected to the at least one RAN 206 node via a wireline interface.

The improved concept 200 of FIG. 2 will further be described with reference to FIGS. 3 to 10.

At first, possible implementations of the NMS 202 and the UEs 208 of FIG. 2 are explained with respect to FIGS. 3 to 9. Then, the overall operation of the concept of FIG. 2 will be described with respect to FIG. 10.

The NMS 202 is responsible for observing the network performance and providing means to service assurance in the operator's network. Further details of the NMS 202 are described with respect to FIG. 3.

As shown in FIG. 3, the NMS 202 comprises a transmitting component 212 and a receiving component 214. Further, the NMS 202 comprises a performance determining component 216 and a configuring component 210 for configuring a measurement configuration. The measurement configuration contains information for instructing the UEs 208 to perform certain measurements. The configuring component 210 of the NMS 202 is adapted to generate the measurement configuration containing at least one of a service specific measurement configuration and an active measurement configuration.

The measurement configuration generated by the configuring component 210 may be dependent on the network performance of the network. The network performance can be provided to the configuring component 210 by the performance determining component 216. The measurement configuration comprising at least one of the service specific measurement configuration and the active measurement configuration as generated by the generating component 210 is forwarded to the transmitting component 212 which transmits the measurement configuration to the DM 204. After the measurements as indicated by the measurement configuration have been performed, the received measurement results are reported back to the receiving component 214 which is adapted to receive the measurement results from the DM 204. The receiving component 214 forwards the received measurement results to the performance determining component 216 which can then determine the network performance based on the received results.

The NMS 202 contains several functions to collect performance measurements like locks, traces, counters or the like from multiple sources, e.g. certain UEs 208. The performance determining component 216 is adapted to process the measurement results in a proper way to create a general view to the network performance or to process the measurement results even further to find the location or route cause of problems/failures/bad performance in the network.

When the data are restricted to a smaller area (e.g., one or more cells), or to certain terminal types or time periods, it may happen that the amount of data collected by the NMS 202 is not enough to draw reliable conclusions about the performance. In order to increase the amount of data, the configuring component 210 of the NMS 202 is, in the present example, adapted to specify the dimensions for which more data is needed (e.g., cell, terminal type, or the like). In this case, the measurement configuration also contains information instructing the UEs 208 of the affected users (e.g., users located in that cell, using that terminal type, etc.) to perform certain measurements in order to collect the additional data. Then, using the MDT concept 200, the NMS 202 sends the generated measurement configuration toward the UEs 208 via the network by means of its transmitting component 212.

FIG. 4 shows a schematic illustration of a UE 208 according to a second device embodiment. The UE 208 comprises a receiving component 220 for receiving at least one of the service specific measurement configuration and the active measurement configuration, a measurement component 222 for performing measurements in accordance with the received measurement configuration (either service specific or active or both service specific and active measurements) and a transmitting component 224 for transmitting the results of the performed measurements.

FIG. 5 shows a schematic illustration of a UE 208 according to a third device embodiment. According to the third device embodiment, the UE 208 has only one component, the receiving and transmitting component 220' for performing the functions of receiving the measurement configuration and transmitting the measurement results.

In order to provide service or application related quality reporting and active measurement capability in the UE 208, the measurement component 222 is provided inside the UE 208. The measurement component 222 can generate traffic when triggered to perform an active measurement based on the measurement configuration. Further, the measurement component 222 can perform traffic and radio measurements and generate service quality reports based on the measurement configuration.

The UE 208 according to the third device embodiment shown in FIG. 5 has an Application Programming Interface (API) between the receiving and transmitting component 220' and the measurement component 222 that enables to control the measurements based on the measurement configuration received from the NMS 202 via the signaling mechanism of MDT, to start/stop the active measurements, and to receive the measurement results that are to be sent back to the NMS 202.

The measurement component 222 has to be capable of interpreting the measurement configuration profile received from the API, initiate application and service quality measurements (if service specific measurements are instructed), generate the appropriate measurement traffic (if active measurements are instructed), collect the measurement results, and forward the measurement results to the API, whenever the API triggers a new measurement.

In this way, the operator is able to make controlled measurements by using the UEs 208.

Figure 6:
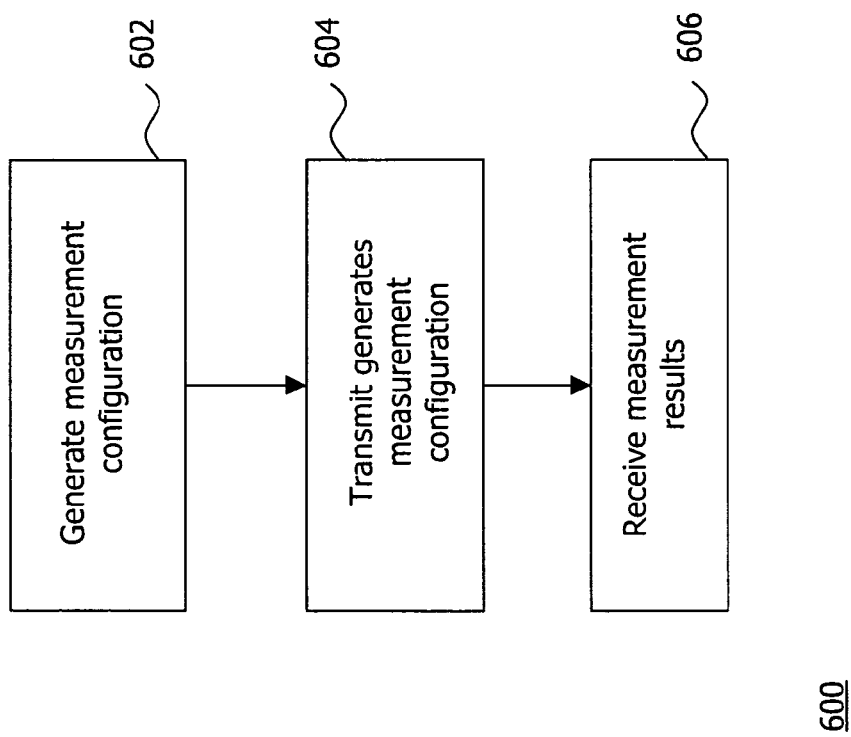
FIG. 6 is a flow diagram schematically illustrating a first method embodiment performed in the network management system of FIG. 3 according to the first device embodiment.

FIG. 6 illustrates a flow diagram of a first method embodiment performed in the NMS 202. In a first step 602, the configuring component 210 of the NMS 202 generates a measurement configuration. The measurement configuration contains either only service specific measurement configuration or only active measurement configuration or both service specific measurement configuration and active measurement configuration. In step 604, the transmitting component 212 of the NMS 202 transmits the measurement configuration to the DM 204. Finally, in step 606, after the measurements instructed by the measurement configuration have been performed, the receiving component 214 of the NMS 202 receives the measurement results from the DM 204.

Figure 7:
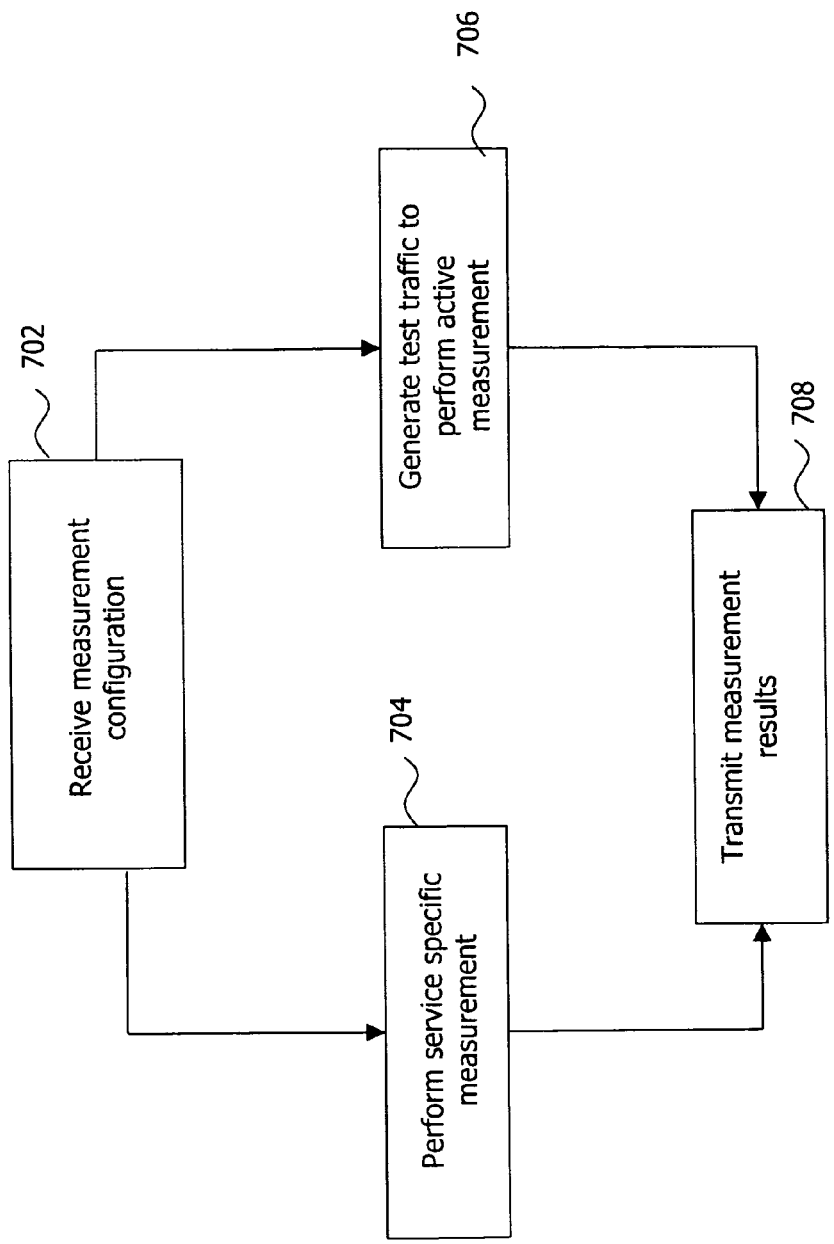
FIG. 7 is a flow diagram schematically illustrating a second method embodiment performed in the user equipment of FIG. 4 according to the second device embodiment.

FIG. 7 illustrates a flow diagram of a second method embodiment performed in the UE 208 of FIG. 4. The method can similarly also be carried out in the UE 208 shown in FIG. 5. In a first step 702, the receiving component 220 of the UE 208 receives a measurement configuration generated by the NMS 202 from the RAN 206 node. The measurement configuration contains either only service specific measurement configuration or only active measurement configuration or both service specific measurement configuration and active measurement configuration. If the measurement configuration contains a service specific measurement configuration, the measurement component 222 of the UE 208 performs service specific measurements as instructed by the service specific measurement configuration in step 704. If the measurement configuration contains an active measurement configuration, the measurement component 222 of the UE 208 generates test traffic as instructed by the active measurement configuration and performs active measurements in accordance with the active measurement configuration in step 706. Finally, the transmitting component 224 of the UE 208 transmits the measurement results to the RAN 206 node in step 708.

The communication between the UE 208 and the RAN node 206 can be performed by using two alternative protocols. Schematic illustrations of these two different solutions are illustrated in FIGS. 8 and 9.

According to the basic concept 100 of FIG. 1, MDT measurements are configured in the UE 208 via a Radio Resource Control (RRC) protocol and the measurement results are reported from the UE 208 also via the RRC protocol.

Figure 8:
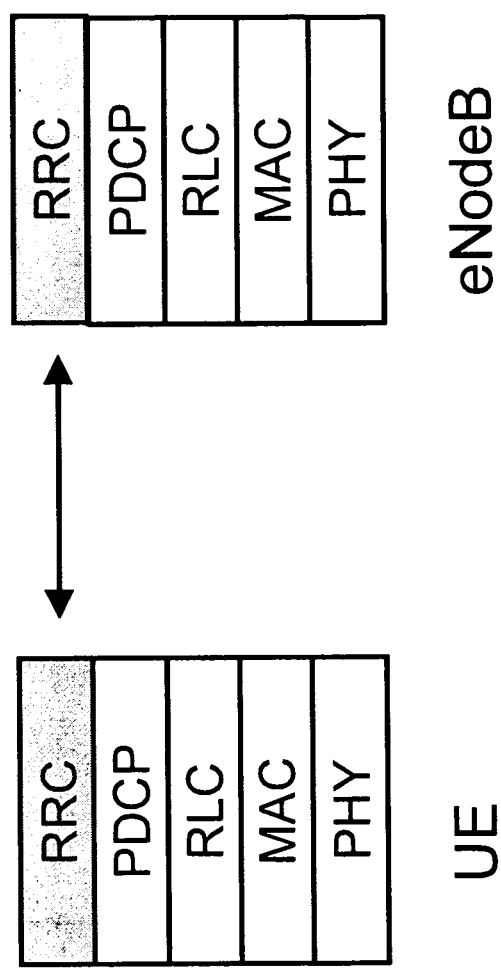
FIG. 8 is a schematic illustration of a protocol stack used by the user equipment of FIG. 5 according to the third device embodiment.

In accordance with the first solution shown in FIG. 8 and implemented in the concept 200 of FIG. 2, the RRC protocol is extended and reused for configuration of active measurements and service specific measurements. In this way, Quality of Experience (QoE) reporting from the UE 208 can be triggered. An illustration of the control plane protocol stack of the first solution is given in FIG. 8. The benefit of triggering application (or service) layer measurements and QoE reporting via the RRC protocol is that the RAN 206 node (i.e., the eNodeB in LTE) can be involved in the UE 208 selection for reporting. For example, an active measurement or QoE reporting may need to be collected and triggered only when the UE 208 is located in certain cells in the network or when it is in bad radio conditions or the like. In case the triggering would be transparent for the RAN 206 node, no such distinction in reporting conditions would be possible to control from the network and a continuous reporting would need to be used instead. Continuous reporting is, however, resource consuming and it can not be used in large scales for active measurements.

Figure 9:
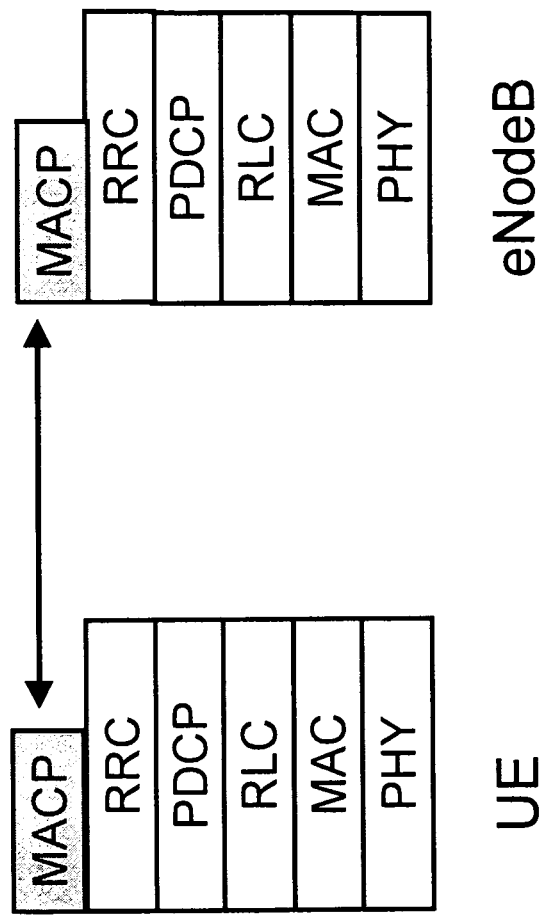
FIG. 9 is a schematic illustration of an alternative protocol stack used by the user equipment of FIG. 5 according to the third device embodiment.

According to a second solution schematically illustrated in FIG. 9, a new control protocol is introduced between the RAN 206 node (eNodeB in LTE) and the UE 208 for configuring active measurements and potentially reporting QoE results. In FIG. 9, this new protocol is exemplarily called MDT Application Control Protocol (MACP), which is used to control the application layer reporting, QoE reporting in the UE 208 as well as active measurements. For the control and reporting of existing MDT radio link layer measurements, the RRC protocol can be used. As exemplarily shown in FIG. 9, the new protocol is placed on top of the RRC protocol.

In accordance with both solutions described with respect to FIGS. 8 and 9, the following information may be conveyed from the eNodeB to the UE 208 to configure measurements:

Service specific measurement results like service quality measurement may include throughput, delay, jitter and the like measured per radio bearer or Mean Opinion Score (MOS) values and other application layer measures measured per application or per application category. Since the operator knows which application category is mapped to which bearer type in its network, it can request different types of service quality measurements per bearer depending on the type of applications mapped to that bearer.

The reporting of service quality measurements may be sent either via the same protocol as used for configuration (i.e., via the RRC or MACP) or it may be sent in the user plane in the application layer from the UE 208 directly to the IP address of a collection node (application layer node) as specified by the operator in the measurement configuration.

In case of the latter, it is also possible to reuse any of the built-in QoE reporting mechanisms available in existing applications. The difference resides in the triggering of such reports, where the trigger comes from the lower layers (i.e., RRC/MACP) and the reports are sent to a collection entity in the operator's network. This, however, requires that existing applications support the configuration API towards the RRC/MACP.

The active measurement configuration includes a trigger toward the measurement component 222 in the UE 208 to generate certain a type of test traffic and start an active measurement using the generated test traffic. The parameters sent to the UE 208 include at least the IP address of the measurement test server to which the measurement component 222 needs to connect and start generating test traffic, the type of test traffic for which there might be a certain set of preconfigured test application types in the UE 208, the direction of the traffic (uplink and/or downlink), and the duration of the test. The network may also set up a separate bearer for the test traffic and configure the packet filtering (QoS mapping) in the UE 208 via the legacy QoS control procedures before sending the measurement configuration to the UE 208.

A similar configuration possibility of service quality measurements and active test traffic generation needs to be added on the Itf-N (the interface between the NMS 202 and the DM 204) in order to allow the NMS 202 to request such measurements from the network, which, in turn, forwards such requests toward the UE 208. This means that the NMS 202 shall be able to initiate an MDT trace session either for a specific UE 208 (based on IMSI or IMEI) or for a certain cell (comprising a plurality of UEs 208) with the following configuration possibility (in addition to existing MDT trace configuration parameters):

Service specific measurement results like service quality measurement may include throughput, delay, jitter and the like measured per radio bearer or Mean Opinion Score (MOS) values and other application layer measures measured per application or per application category. Since the operator knows which application category is mapped to which bearer type in its network, it can request different types of service quality measurements per bearer depending on the type of applications mapped to that bearer.

The active measurement configuration includes a trigger toward the measurement component in the UE 208 to generate certain a type of test traffic and start an active measurement using the generated test traffic. The parameters sent to the UE 208 include at least the IP address of the measurement test server to which the measurement component needs to connect and start generating test traffic, the type of test traffic for which there might be a certain set of preconfigured test application types in the UE, the direction of the traffic (uplink and/or downlink), and the duration of the test. The network may also set up a separate bearer for the test traffic and configure the packet filtering (QoS mapping) in the UE 208 via the legacy QoS control procedures before sending the measurement configuration to the UE 208.

The configuration of active measurements and the configuration of service quality reporting may be used independently. The two following scenarios are conceivable and exemplarily illustrate how the proposed configurations may be combined:

In use case 1, the operator configures active measurements in certain cells and/or for certain UE 208 categories or when certain conditions in the cell prevail (e.g., congestion, poor radio quality, etc.) and collects the trace logs from the eNodeBs.

This allows the operator to collect legacy trace logs (i.e., eNodeB and network reports) for selected UEs 208 in selected cells also when no traffic would be generated by the UEs 208 otherwise. In addition to the eNodeB reports the operator can also utilize application level statistics measured in the test server (to which the measurement component in the UE 208 connects to for active traffic generation).

In use case 2, the operator configures the UE 208 to report application layer and QoE performance measures, which may include metrics that can be measured also by the lower layers in the UE 208 (e.g., metrics measured per radio bearer by the UE 208 baseband part) or it may include metrics that can be reported only by the application layers (e.g., MOS values).

Figure 10:
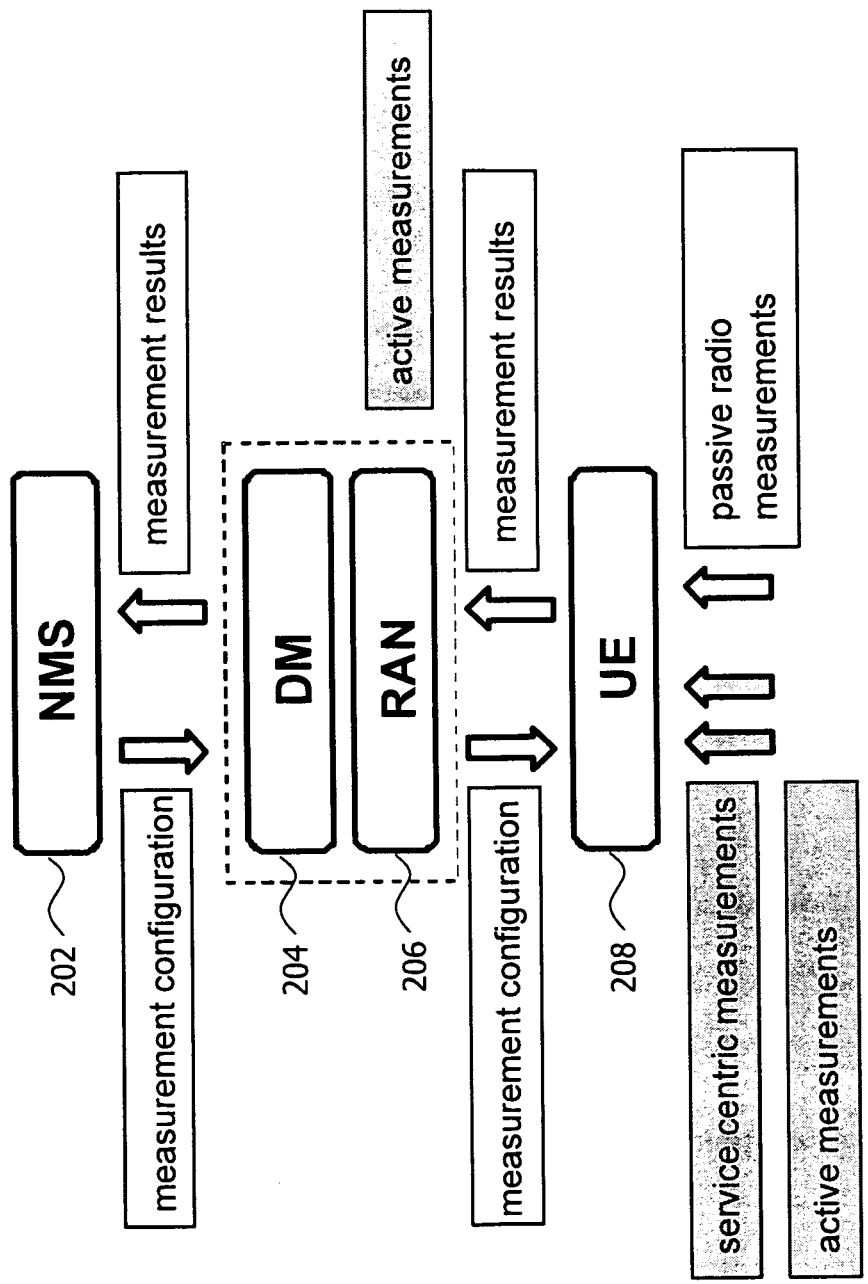
FIG. 10 is a flow chart illustrating the operation of the concept shown in FIG. 2.

FIG. 10 shows the overall operation of the improved MDT concept 200 of FIG. 2. At first, the NMS 202 determines a measurement configuration including the subset of UEs 208 to perform the measurements based on the measurement configuration. Then, the NMS 202 sends the measurement configuration to the DM 204. The DM 204 configures the selected subset of RAN 206 nodes (i.e., the subset of RAN 206 nodes corresponding to or connected with the subset of UEs 208 selected by the NMS 202) and the selected subset of RAN 206 nodes send the measurement configuration to the selected UEs 208. The UEs 208 perform active measurement when it is triggered, make radio and service quality measurements and generate QoE reports in accordance with the measurement configuration. The UEs 208 send the measurement results to the RAN 206 nodes which can also collect own measurements. The DM 204 fetches the measurement results from the RAN 206. These measurement results can also include the measurement results of the measurements performed by the RAN 206 nodes themselves (if performed) in addition to the measurement results receives from the UEs 208. The DM 204 sends the measurement results to the NMS 202. Finally, the NMS 202 uses the measurement results for monitoring or problem detection.

For service performance management in certain geographical areas, the following exemplary implementation can be performed:

The NMS 202 detects coverage problems in a certain area of the RAN 206 and the operator wants to know how these problems impact service quality. The MDT measurement configuration is set in the NMS 202 so that UEs 208 located in that area are selected to perform measurements for the selected end user services.

The NMS 202 configures and sends the MDT measurement configuration to the DM 204 management node. The NMS 202 uses the standardized Itf-N interface procedures to initiate an MDT trace session with extended parameters requesting service centric measurements and/or active text traffic generation.

The DM 204 initiates the trace sessions in the respective RAN 206 or CN (Core Network) nodes, depending on whether the trace is initiated for a certain cell or for a given UE 208 with specific IMSI/IMEI. The trace trigger is propagated to the respective RAN 206 node, which sends the MDT measurement configuration to the selected UEs 208. The RAN 206 node may execute UE 208 selection for service measurements according to the configured trace parameters (e.g., only UEs 208 in certain cells or with certain device capabilities are selected for the measurements).

The RAN may use the existing RRC signaling procedures used for the configuration of MDT measurements or a newly added MDT application control protocol (MACP) specifically used only for service and application layer measurement configuration to configure service specific MDT measurements in the UE 208.

The API in the UEs 208 receives the request and controls the measurement component to perform the measurements specified in the MDT measurement configuration (generate traffic if it is instructed).

The UEs 208 perform the measurements in accordance with the measurement configuration and send the measurement results back to the RAN 206 nodes. The RAN 206 nodes may also collect their own trace measurements related to the particular UE 208.

The NMS 202 fetches the measurement results from the RAN 206 nodes (e.g. cia the DM 204) and the operator can see the performance impact of the coverage problem. The measurement results can be collected via the trace result reporting mechanism, where the network nodes collecting the trace measurements report the results as a trace file to the Trace Collection Entity (TCE), as specified in the trace configuration.

The solution proposed herein enables the operator to control and collect service specific UE performance measurements and activate specific test traffic generation to/from UEs for service centric network management purposes. With the addition of service layer UE performance measurements used in combination with UE radio layer performance measurements and network measurements, the operator will have a full control over the performance data collection from low level radio performance up to service layer performance data. This facilitates to omit drive tests not only for radio measurement purposes but also for application performance collection purposes as well.

The invention claimed is:

1. A method for collecting network performance measurements in a mobile communications network, the mobile communications network comprising at least one network node and at least one mobile terminal connected to the at least one network node, implementing a Minimization of Drive Tests (MDT) trace measurement configuration and collection, the method comprising:

performing, in the at least one mobile terminal, a service-specific measurement based on a service-specific measurement configuration, wherein the service-specific measurement includes determining one or more quality metrics related to at least one of one or more services, one or more service types, one or more bearers, one or more applications, and one or more application types provided in the mobile communications network, to obtain a result of the performed service-specific measurement;

generating, in the at least one mobile terminal, active test traffic based on an active measurement configuration to perform an active measurement, wherein the active measurement uses the generated test traffic to obtain a result of the performed active measurement, the result of the performed active measurement indicating the performance of the test traffic in the mobile communications network; and receiving, by the at least one mobile terminal, at least one of the service-specific measurement configuration and the active measurement configuration from the at least one network node via the 3GPP Radio Resource Control (RRC) protocol or via a dedicated measurement configuration protocol, or both.

2. The method of claim 1, wherein the method further comprises:

transmitting, by the at least one mobile terminal, at least one of the result of the performed service-specific measurement and the result of the performed active measurement to the at least one network node; and forwarding, by the at least one network node, at least one of the received result of the performed service-specific measurement and the received result of the performed active measurement to a network management system.

3. The method of claim 2, wherein the method further comprises:
performing, by the at least one network node, active measurements using the generated test traffic; and
transmitting, by the at least one network node, the results of the active measurements to the network management system.

4. The method of claim 1, wherein the active measurement configuration includes parameters for configuring the test traffic for performing the active measurement and the parameters include at least one of the address of a test server to which the at least one mobile terminal has to connect for generating the test traffic, the type of the test traffic, the direction of the test traffic, and the duration of the test.

5. The method of claim 4, wherein the method further comprises the step of generating, by the at least one mobile terminal, the test traffic, based on the parameters.

6. The method of claim 1, wherein the quality metrics comprise at least one of throughput, loss, delay, jitter and Quality of Experience (QoE), of at least one of the one or more services, one or more service types, one or more bearers, one or more applications and one or more application types.

7. The method of claim 1, wherein the active measurement comprises at least one of a service-specific measurement and a non-service-specific measurement.

8. The method of claim 1, wherein the service-specific measurement is based upon the generated active test traffic.

9. The method of claim 1, wherein a combined measurement configuration comprises both the service-specific measurement configuration and the active measurement configuration.

10. A method for configuring network performance measurements in a mobile communications network, the mobile communications network comprising at least one network node, at least one mobile terminal connected to the at least one network node, and a network management system connected to the at least one network node, implementing a Minimization of Drive Tests (MDT) trace measurement and collection, the method comprising:
transmitting, by the network management system, at least one of a service-specific measurement configuration for performing, in the at least one mobile terminal, a service-specific measurement and an active measurement configuration for generating, in the at least one mobile terminal, an active test traffic to perform an active measurement, wherein performing the service-specific measurement includes determining one or more quality metrics related to at least one of one or more services, one or more service types, one or more bearers, one or more applications and one or more application types provided in the mobile communications network, to obtain a result of the performed service-specific measurement, and the active measurement uses the generated test traffic to obtain a result of the performed active measurement, the result of the performed active measurement indicating the performance of the test traffic in the mobile communications network; and
receiving, by the network management system, the result of the performed service-specific measurement and the result of the performed active measurement;
wherein said transmitting comprises transmitting at least one of the service-specific measurement configuration and the active measurement configuration using the 3GPP trace management IRP services on the Itf-N interface.

11. The method of claim 10, wherein the method further comprises determining, by the network management system, the network performance, based on the received result of the performed service-specific measurement and the received result of the performed active measurement.

12. The method of claim 10, wherein the method further comprises processing, by the network management system, the received result of the performed service-specific measurement and the received result of the performed active measurement to identify the cause of decreased network performance.

13. The method of claim 10, wherein the method further comprises selecting, by the network management system, the at least one mobile terminal based on a detection of decreased network performance in an area in which the at least one mobile terminal is located.

14. The method of claim 10, wherein the service-specific measurement is based upon the generated active test traffic.

15. The method of claim 10, wherein a combined measurement configuration comprises both the service-specific measurement configuration and the active measurement configuration.

16. A non-transitory computer-readable medium comprising program code portions stored thereupon, the program code portions comprising instructions which, when executed by a computer system in a mobile terminal connected to a network node and implementing a Minimization of Drive Tests (MDT) trace measurement configuration and collection, cause the mobile terminal to:
perform a service-specific measurement based on a service-specific measurement configuration, wherein the service-specific measurement includes determining one or more quality metrics related to at least one of one or more services, one or more service types, one or more bearers, one or more applications, and one or more application types provided in the mobile communications network, to obtain a result of the performed service-specific measurement;
generate active test traffic based on an active measurement configuration to perform an active measurement, wherein the active measurement uses the generated test traffic to obtain a result of the performed active measurement, the result of the performed active measurement indicating the performance of the test traffic in the mobile communications network; and
receive at least one of the service-specific measurement configuration and the active measurement configuration from the at least one network node via the 3GPP Radio Resource Control (RRC) protocol or via a dedicated measurement configuration protocol, or both.

17. A mobile terminal for collecting network performance measurements in a mobile communications network, the mobile communications network comprising at least one network node and the mobile terminal connected to the at least one network node, implementing a Minimization of Drive Tests (MDT) trace measurement configuration and collection, wherein the mobile terminal comprises a measurement component that is adapted to:
perform a service-specific measurement based on a service-specific measurement configuration, wherein the service-specific measurement includes determining one or more quality metrics related to at least one of one or more services, one or more service types, one or more bearers, one or more applications and one or more application types provided in the mobile communications network, to obtain a result of the performed service-specific measurement; and generate an active test traffic based on an active measurement configuration to perform an active measurement, wherein the active measurement uses the generated test traffic to obtain a result of the performed active measurement, the result of the performed active measurement indicating the performance of the test traffic in the mobile communications network;

wherein the mobile terminal further comprises a receiving component adapted to receive at least one of the service-specific measurement configuration and the active measurement configuration from the at least one network node via the 3GPP Radio Resource Control (RRC) protocol or a dedicated measurement configuration protocol, or both.

18. The mobile terminal of claim 17, further comprising a transmitting component adapted to transmit the result of the performed service-specific measurement and the result of the performed active measurement to the at least one network node.

19. The mobile terminal of claim 17, wherein the active measurement configuration includes parameters for configuring the test traffic for performing the active measurement, and the mobile terminal further comprises a traffic generating component for generating the test traffic based on the parameters.

20. A network management system for configuring network performance measurements in a mobile communications network, the mobile communications network comprising at least one network node and at least one mobile terminal connected to the at least one network node, implementing a Minimization of Drive Tests (MDT) trace measurement configuration and collection, wherein the network management system comprises:

a transmitting component adapted to transmit at least one of a service-specific measurement configuration for performing, in the at least one mobile terminal, a service-specific measurement and an active measurement configuration for generating, in the at least one mobile terminal, an active test traffic to perform an active measurement, wherein the service-specific measurement includes determining one or more quality metrics related to at least one of one or more services, one or more service types, one or more bearers, one or more applications and one or more application types provided in the mobile communications network, to obtain a result of the performed service-specific measurement, and the active measurement uses the generated test traffic to obtain a result of the performed active measurement, the result of the performed active measurement indicating the performance of the test traffic in the mobile communications network; and a receiving component adapted to receive the result of the performed service-specific measurement and the result of the performed active measurement;

wherein the transmitting component is adapted to transmit at least one of the service-specific measurement configuration and the active measurement configuration using the 3GPP trace management IRP services on the Itf-N interface.

21. The network management system of claim 20, further comprising a performance determining component adapted to determine the network performance based on the received result of the performed service-specific measurement and the received result of the performed active measurement.

* * * * *